(12) United States Patent
Zheng et al.

(10) Patent No.: US 9,091,806 B2
(45) Date of Patent: Jul. 28, 2015

(54) SURFACE-NORMAL OPTICAL COUPLING USING A HOLOGRAPHIC RECORDING MATERIAL

(75) Inventors: Xuezhe Zheng, San Diego, CA (US); Ashok V. Krishnamoorthy, San Diego, CA (US); Kannan Raj, San Diego, CA (US); James R. Adleman, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 132 days.

(21) Appl. No.: 13/440,839

(22) Filed: Apr. 5, 2012

(65) Prior Publication Data

US 2013/0265624 A1 Oct. 10, 2013

(51) Int. Cl.
*G02B 5/32* (2006.01)
*G02B 6/122* (2006.01)
*G02B 6/42* (2006.01)

(52) U.S. Cl.
CPC .............. *G02B 6/122* (2013.01); *G02B 6/4204* (2013.01)

(58) Field of Classification Search
CPC ......... G02B 6/122; G02B 6/34; G02B 6/4206
USPC .................. 359/15, 34; 385/14, 37, 123–132; 438/65, 69
See application file for complete search history.

(56) References Cited

U.S. PATENT DOCUMENTS

| | | | |
|---|---|---|---|
| 4,838,630 A * | 6/1989 | Jannson et al. | 359/3 |
| 5,568,574 A | 10/1996 | Tanguay, Jr. | |
| 5,745,421 A * | 4/1998 | Pham et al. | 365/203 |
| 6,285,813 B1 * | 9/2001 | Schultz et al. | 385/37 |
| 6,815,828 B1 * | 11/2004 | Coronel et al. | 257/777 |
| 7,269,326 B2 * | 9/2007 | Paddon et al. | 385/146 |
| 2004/0126061 A1 | 7/2004 | Bablumyan | |
| 2007/0154144 A1 * | 7/2007 | Greiner et al. | 385/37 |
| 2010/0327150 A1 * | 12/2010 | Mossberg et al. | 250/214 R |

FOREIGN PATENT DOCUMENTS

EP 0423702 A2 4/1991
WO 2010140997 A1 12/2010

OTHER PUBLICATIONS

Celler, G. K. et al. "Frontiers of silicon-on-insulator" Journal of Applied Physics, vol. 93, No. 9, (May 1, 2003) pp. 4955-4978.*
Almeida, V.R. et al., "Nano-taper mode-size converter,"Conference on Lasers and Electro-Optics, CLEO '03, Jun. 1-6, 2003.

(Continued)

*Primary Examiner* — Thomas K Pham
*Assistant Examiner* — Cara Rakowski
(74) *Attorney, Agent, or Firm* — Park, Vaughan, Fleming & Dowler LLP; Steven E. Stupp (57) ABSTRACT

An integrated circuit includes a holographic recording material substantially filling a cavity in a semiconductor layer. During operation of the integrated circuit, a holographic pattern in the holographic recording is reconstructed and used to diffract an optical signal propagating in a plane of an optical waveguide, which is defined in the semiconductor layer out of the plane through the cavity. In this way, the holographic recording material may be used to couple the optical signal to an optical fiber or another integrated circuit.

20 Claims, 9 Drawing Sheets

(56) References Cited

OTHER PUBLICATIONS

Shoji, T. et al., "Low Loss Mode Size Converter from 0.3um Square Si Wire Waveguides to Single Mode Fibers," Electronics Letters, vol. 38, No. 25, pp. 1669-1670, Dec. 2002.
Csutak, S.M. et al. "CMOS-compatible planar silicon waveguide-grating-coupler photodetectors fabricated on silicon-on-insulator (SOI) substrates," IEEE Journal of Quantum Electronics, vol. 38, Issue 5, pp. 477-480 May 2002.
Maire, G. et al., "High efficiency silicon nitride surface grating couplers," Opt. Express, 16(1):328-333, 2008.
Yao, Jin et al., "Grating Coupler Based Optical Proximity Coupling for Scalable Computing Systems," SPIE Photonics West 2011, Optoelectronic Interconnects and Component Integration XI (0E112), 2011.
Alonso-Ramos C. et al., "Single-etch grating coupler for micrometric silicon rib waveguides," Opt. Lett. 36, 2647-2649 (2011).
Zheng, Xuezhe et al., "Optical proximity communication using reflective mirrors", Optics Express, 16(19), 15052-15058, 2008.
Lee, Daniel C. et al., "Monolithic Chip-to-chip WDM Optical Proximity Coupler Utilizing Echelle Grating Multiplexer/Demultiplexer Integrated with Micro Mirrors Built on SOI Platform," IEEE Photonics Society Summer Topical Meetings, Playa del Carmen, Riviera Maya, Mexico , Jul. 2010. TuD3.3.

* cited by examiner

SURFACE-NORMAL OPTICAL COUPLING USING A HOLOGRAPHIC RECORDING MATERIAL

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure generally relates to integrated circuits that include optical couplers. More specifically, the present disclosure relates to an integrated circuit that includes an optical coupler which comprises a holographic recording material that diffracts an optical signal out of a plane of the integrated circuit.

2. Related Art

As semiconductor line-widths continue to decrease in size while on-chip clock speeds increase there is a growing the disparity between on-chip communication bandwidth and the off-chip communication bandwidth. This growing disparity is causing off-chip communication bandwidth to become a major bottleneck that limits overall system performance. This problem is especially acute in high-performance computing systems which are based on massively parallel architectures.

Researchers have attempted to use high-speed serial transceivers in chip-to-chip interconnects to improve off-chip communication bandwidth so that it matches the on-chip communication bandwidth. However, the bandwidth-density of high-speed serial transceivers, as well as other existing conductive electrical interconnections, is typically limited by: the topology, contact and parasitic RC limits, and power dissipation when driving low-impedance off-chip signal lines.

Silicon photonics has been proposed as a potential solution for these limitations. Silicon photonics integrates optics and microelectronics monolithically on the same silicon CMOS chip. It relies on silicon waveguide-based modulators with microelectronic control to convert electrical data signals into optical signals propagating in silicon optical waveguides. Because of the large index of refraction, silicon optical waveguides typically have strong light confinement with sub-micrometer-size cross-sectional dimensions. This enables small optical-waveguide bending radii and, therefore, a high density of photonic devices on chip.

However, efficiently coupling light into and out of silicon chips remains a big challenge because of the sub-micrometer mode size of the silicon optical waveguides. Optical fibers, which are one of the conventional transmission media between chips, typically have a mode size of 6-10 $\mu m$. The resulting mode-size mismatch can result in significant optical losses. Furthermore, it is anticipated that future high-performance computing systems will use wavelength division multiplexing (WDM) to multiplex multiple data channels onto a single optical fiber in order to meet the desired high bandwidth-density product. In addition, wafer-scale optical testing of the integrated optical devices is important for a low-cost solution.

Several light-coupling techniques have been proposed and implemented. For example, a tapered optical waveguide has been used to couple light into a sub-micron size optical waveguide with low loss. This broadband technique can accommodate a large range of wavelengths, but typically requires edge-coupling of the optical fibers and, thus, usually does not allow a two-dimensional array of optical couplers to be defined on the surface of the chip. As a consequence, a tapered optical waveguide may not allow wafer-scale optical testing of the integrated optical devices. In addition, tapered optical waveguides are often implemented using silicon-on-insulator (SOI) technology with a thick buried-oxide (BOX) layer to the tapered optical-waveguide mode from leaking into the silicon substrate. Such a thick BOX layer may limit the thermal performance of the integrated optical devices. Moreover, precision edge polishing is often required to ensure that the inverse taper tips of a tapered optical waveguide are close to an edge of the chip, which can be difficult to achieve.

Another light-coupling technique uses grating to couple surface-normal or near surface-normal light from optical fibers into sub-micron optical waveguides. These sub-micron grating structures are typically etched onto the optical waveguide directly using high-resolution deep ultraviolet lithography. For optimal performance, the grating structure usually needs to be carefully designed and fabricated. However, even with state-of-the-art CMOS fabrication processes, the center wavelength of such grating couplers usually cannot be accurately controlled. For example, because of substrate scattering and mode mismatch, it is extremely difficult to achieve a coupling loss that is less than 1 dB, especially for chip-to-chip coupling. As a consequence, this coupling technique is usually preferred for a sub-micron SOI platform. It is typically more difficult to design grating couplers for use with a thicker SOI platform, such as one with a 3-$\mu m$ thick semiconductor layer.

In yet another light-coupling technique, surface-normal couplers are implemented using optical-waveguide tapers and reflecting mirrors. These surface-normal couplers are often used with relatively large silicon optical waveguides, such as those based on a 3-$\mu m$ thick semiconductor layer in an SOI platform. While reasonable performance has been demonstrated for chip-to-chip coupling using an optical-waveguide taper to convert a 3 $\mu m$ mode to a 10 $\mu m$ mode, further performance improvement is very difficult because of: an asymmetric optical-waveguide mode profile, geometry limitations and optical-waveguide taper loss. However, without an optical-waveguide taper, a complicated lens imaging system typically has to be used to minimize the optical loss, which often involves a much more complicated design and fabrication process.

The preceding light-coupling techniques usually require accurate alignment of the components in the integrated optical devices. In particular, for minimal misalignment optical loss, sub-micron alignment tolerance is usually needed. However, the degree of alignment can be difficult to achieve in a low-cost, high-yield design.

Hence, what is needed is an integrated circuit that does not suffer from the above-described problems.

SUMMARY

One embodiment of the present disclosure provides an integrated circuit that includes: an optical waveguide defined in a semiconductor layer; a cavity, defined by a surface, in the semiconductor layer; and a holographic recording material substantially filling the cavity. The holographic recording material may diffract an optical signal propagating in a plane of the optical waveguide out of the plane through the cavity.

Note that the semiconductor may include silicon.

Moreover, the optical signal may be diffracted at an angle of 90° with respect to a direction of propagation in the plane.

In some embodiments, the integrated circuit includes an optical fiber having a symmetry axis along a direction perpendicular to the plane, where the holographic recording material diffracts the optical signal from the optical waveguide to the optical fiber. Alternatively or additionally, the holographic recording material diffracts the optical signal along a direction perpendicular to the plane, thereby coupling the optical signal from the optical waveguide to another optical waveguide in another integrated circuit.

The integrated circuit may include: a substrate; and a buried-oxide layer disposed on the substrate, where the semiconductor layer is disposed on the buried-oxide layer, and where the cavity extends through the buried-oxide layer and the substrate. Note that the substrate may include a semiconductor. Therefore, the substrate, the buried-oxide layer and the semiconductor layer may constitute a silicon-on-insulator technology.

Furthermore, the holographic recording material may include a volume diffraction grating so that a range of wavelengths in the optical signal are diffracted out of the plane. For example, the range of wavelengths may be at least 40 nm wide.

Another embodiment provides a system (such as an electronic device) that includes the integrated circuit. This system may or may not include a processor and a memory that stores a program module.

Another embodiment provides a method for diffracting an optical signal in the integrated circuit. During operation, the optical waveguide, disposed in the semiconductor layer in the integrated circuit, conveys the optical signal in the plane of the optical waveguide. Then, the holographic recording material that substantially fills the cavity, defined by the surface, in the semiconductor layer diffracts the optical signal out of the plane of the optical waveguide.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an integrated circuit, a system that includes the integrated circuit, and a method for diffracting an optical signal in the integrated circuit are described. This integrated circuit includes a holographic recording material substantially filling a cavity in a semiconductor layer. During operation of the integrated circuit, a holographic pattern in the holographic recording is reconstructed and used to diffract an optical signal propagating in a plane of an optical waveguide, which is defined in the semiconductor layer out of the plane through the cavity. In this way, the holographic recording material may be used to couple the optical signal to an optical fiber or another integrated circuit.

By providing surface-normal coupling of the optical signal, the integrated circuit may facilitate coupling of the optical signal from the optical waveguide to an optical fiber or to another optical waveguide with low optical loss. Thus, the light-coupling technique may address the challenges of: mode matching, in which the optical-waveguide mode is converted to match the optical mode of the output optical fiber or optical waveguide; and 90°-bending of light propagation from in the plane of the optical waveguide to the surface normal. In addition, the light-coupling technique may relax the alignment requirements on components in the integrated circuit, thereby facilitating low cost and high yield (such as self-alignment and/or rework capability in large arrays), even when used with high-contrast silicon optical waveguides having sub-micron optical-mode size.

Figure 1:
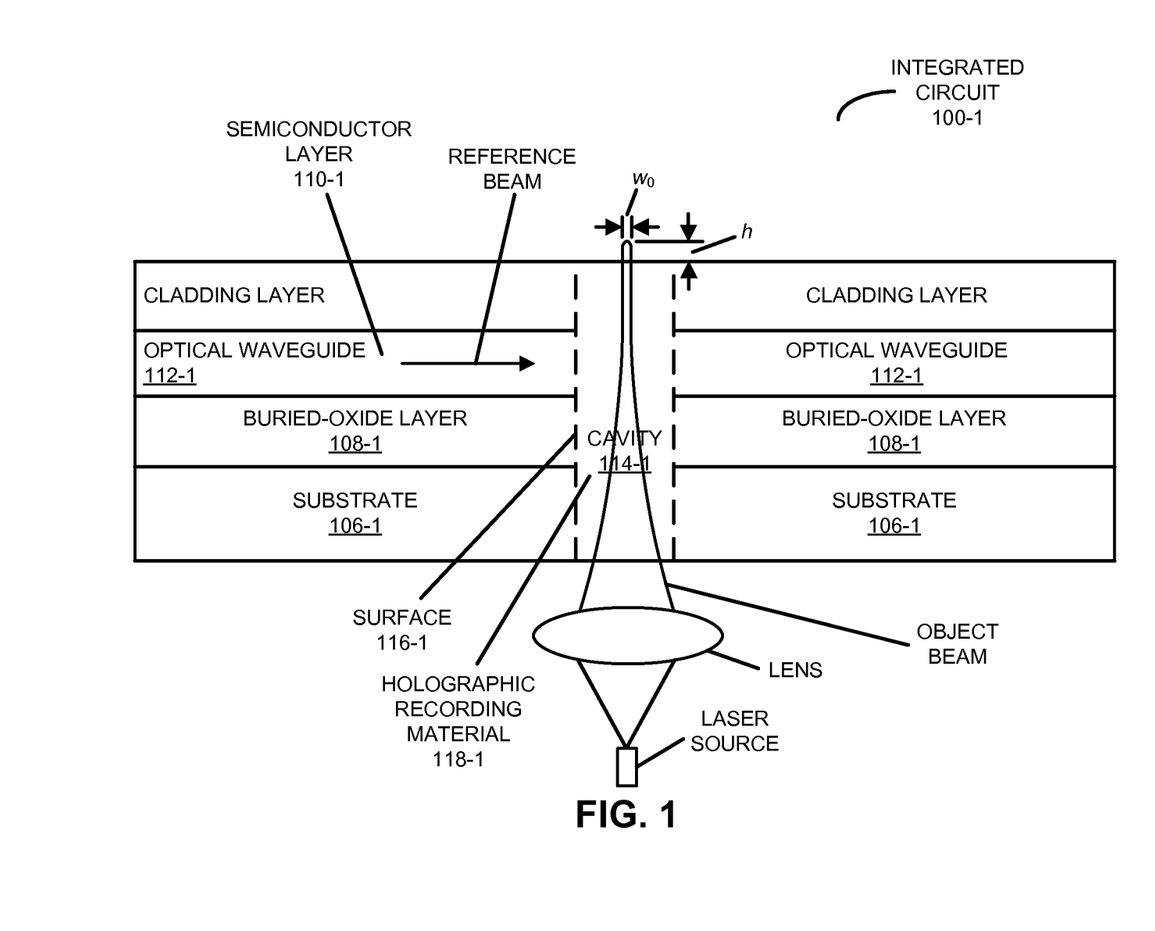
FIG. 1 is a block diagram illustrating a side view of an integrated circuit during the recording of a holographic pattern in a holographic recording material in accordance with an embodiment of the present disclosure.

We now describe embodiments of the integrated circuit. FIG. 1 presents a block diagram illustrating a side view of an integrated circuit 100-1 during the recording of a holographic pattern in a holographic recording material 118-1. This integrated circuit includes: an optical waveguide 112-1 defined in a semiconductor layer 110-1 (such as silicon); a cavity 114-1, defined by a surface 116-1, in semiconductor layer 110-1; and holographic recording material 118-1 substantially filling cavity 114-1 (for example, holographic recording material 118-1 may fill 90-100% of cavity 114-1). As described below with reference to FIG. 2, this holographic recording material may be surface-normal recordable holographic material that enables a light field to be recorded and subsequently reconstructed when the original light field is no longer present. This hologram can be used to simultaneously achieve both mode matching and 90°-bending. For example, holographic recording material 118-1 may include: a high dielectric-constant material, a photo-refractive material that can be fixed, etc. (for example, $KTa_{1-x}Nb_xO_3$, $BaTiO_3$, $LiNbO_3$, $BiSiO_3$, etc.).

As shown in FIG. 1, a recording laser source may be focused through holographic recording material 118-1 using optics to generate an object laser beam with a Gaussian profile and the correct beam-waist size $w_0$ that matches the targeted coupling mode (e.g., the optical-fiber mode) and waist location h (e.g., the position of the end of the optical fiber). Then, holographic recording material 118-1 is illuminated by a reference beam using terminated optical waveguide 112-1. The resulting interference between the two light beams may record a hologram. This hologram may represent a volume (3D) diffraction grating (such as a diffraction pattern), which may give this diffraction grating high-angular resolution and efficiency at a specific angle (such as angles up to) 90°. (Therefore, holographic recording material 118-1 with a recorded hologram is sometimes referred to as a 'surface-normal coupler'.)

After recording, the recorded volume holographic grating structure may be fixed in holographic recording material 118-1 (for example, using temperature). Note that the hologram may be write-once or reconfigurable (i.e., holographic recording material 118-1 may be re-recordable). In addition, as shown below with reference to FIG. 2, because the recording beam images holographic recording material 118-1 from below, during reconstruction of the hologram optical signal 210-1 will be diffracted upward.

Integrated circuit 100-1 may include: a substrate 106-1; and a buried-oxide layer 108-1 disposed on substrate 106-1, where semiconductor layer 110-1 is disposed on buried-oxide layer 108-1, and where cavity 114-1 extends through buried-oxide layer 108-1 and substrate 106-1. Note that substrate 106-1 may include a semiconductor, such as silicon. Therefore, substrate 106-1, buried-oxide layer 108-1 and semiconductor layer 110-1 may constitute a silicon-on-insulator (SOI) technology.

Figure 2:
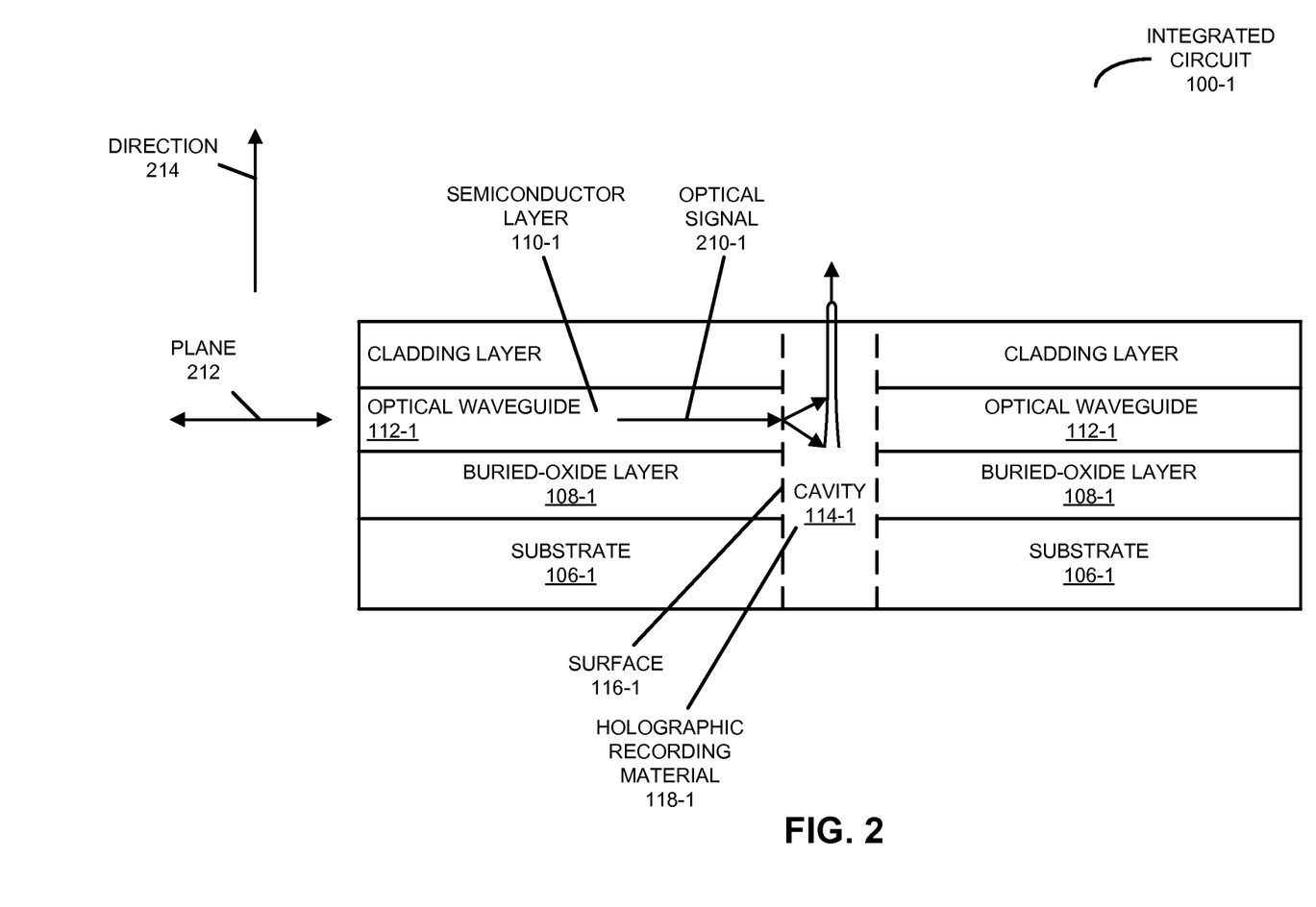
FIG. 2 is a block diagram illustrating a side view of the integrated circuit of FIG. 1 during reconstruction of the holographic pattern in the holographic recording material in accordance with an embodiment of the present disclosure.

Note that optical signal 210-1 in FIG. 2 (or light) in optical waveguide 112-1 is highly confined because of the big difference between the index of refraction of semiconductor layer 110-1 and the surrounding material. In an exemplary embodiment optical waveguide 112-1 conveys optical signal 210-1 (FIG. 2) having wavelengths between 1.1-1.7 μm, such as an optical signal having a fundamental wavelength of 1.3 or 1.55 μm. This optical waveguide may have a thickness between 0.25 and 3 μm, and a width between 0.5 and 3 μm. Because optical waveguide 112-1 may have a quasi-rectangular cross-section, it may be a quasi-single mode component. Moreover, buried-oxide layer 108-1 may have a thickness between 0.3 and 3 μm.

FIG. 2 presents a block diagram illustrating a side view of integrated circuit 100-1 during reconstruction of the holographic pattern in holographic recording material 118-1. In particular, light in optical waveguide 112-1 may reproduce the 'optical field' source pattern used during recording. For example, optical signal 210-1 may have the same wavelength (such as 1.3 or 1.55 μm) as in FIG. 1. Therefore, the recording object beam may be reconstructed with exactly the same beam parameters in order to reconstruct the hologram. For a volume phase hologram, the reconstruction may be very efficient. For example, it may be possible to diffract 100% of optical signal 210-1.

Thus, holographic recording material 118-1 may diffract optical signal 210-1 propagating in a plane 212 of optical waveguide 112-1 out of plane 212 (i.e., along direction 214) through cavity 114-1. In particular, the volume diffraction grating stored in holographic recording material 118-1 may operate for a range of wavelengths in optical signal 210-1 so that these wavelengths are diffracted out of plane 212 (i.e., optical signal 210-1 may be diffracted at an angle of up to 90° with respect to a direction of propagation in plane 212 or normal to a surface of integrated circuit 100-1). For example, the range of wavelengths may be at least 40 nm wide.

Holographic recording material 118-1 can be used for surface-normal coupling of light from optical waveguide 112-1 to an optical fiber. When recorded with an objective beam matching an optical-fiber mode, the reconstructed beam may have almost perfect mode matching with the optical fiber. As a consequence, very low-loss optical waveguide-to-optical fiber coupling can be achieved.

Figure 3:
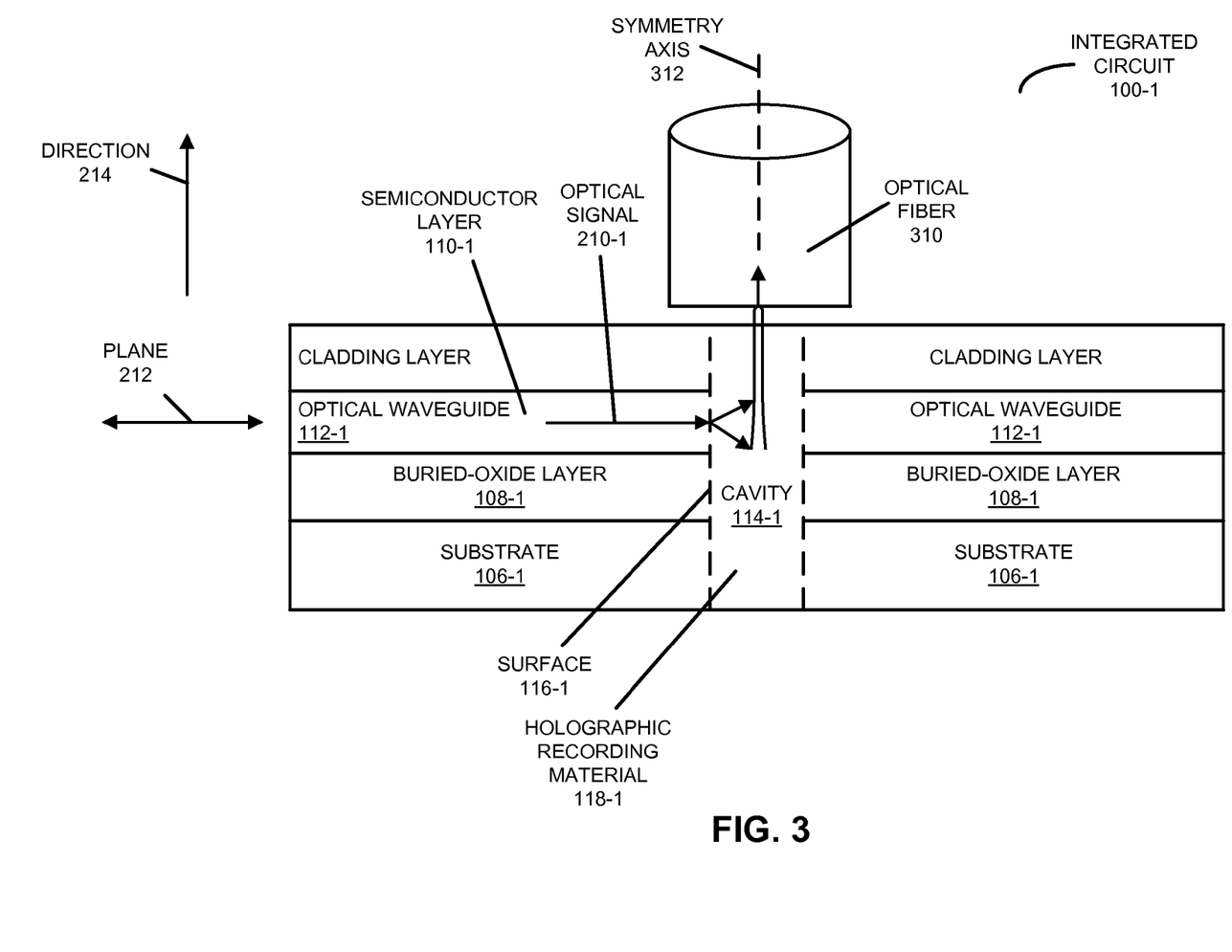
FIG. 3 is a block diagram illustrating a side view of the integrated circuit of FIG. 1 during surface-normal coupling of an optical signal to an optical fiber using the holographic pattern in the holographic recording material in accordance with an embodiment of the present disclosure.

This is shown in FIG. 3, which presents a block diagram illustrating a side view of integrated circuit 100-1 during surface-normal coupling of optical signal 210-1 to an optical fiber 310 using the holographic pattern in holographic recording material 118-1. This optical fiber may have a symmetry axis 312 along a direction 214 perpendicular to plane 212. Thus, by reconstructing the holographic pattern, holographic recording material 118-1 diffracts optical signal 210-1 from optical waveguide 112-1 to optical fiber 310.

By reversing the recording geometry, holographic recording material 118-1 may be configured so that optical signal 210-1 is diffracted 'down' instead of 'up' (i.e., in the opposite direction than shown in FIGS. 2 and 3). Also note that holograms may be recorded for both directions of propagation of optical signal 210-1 in optical waveguide 112-1.

Figure 4:
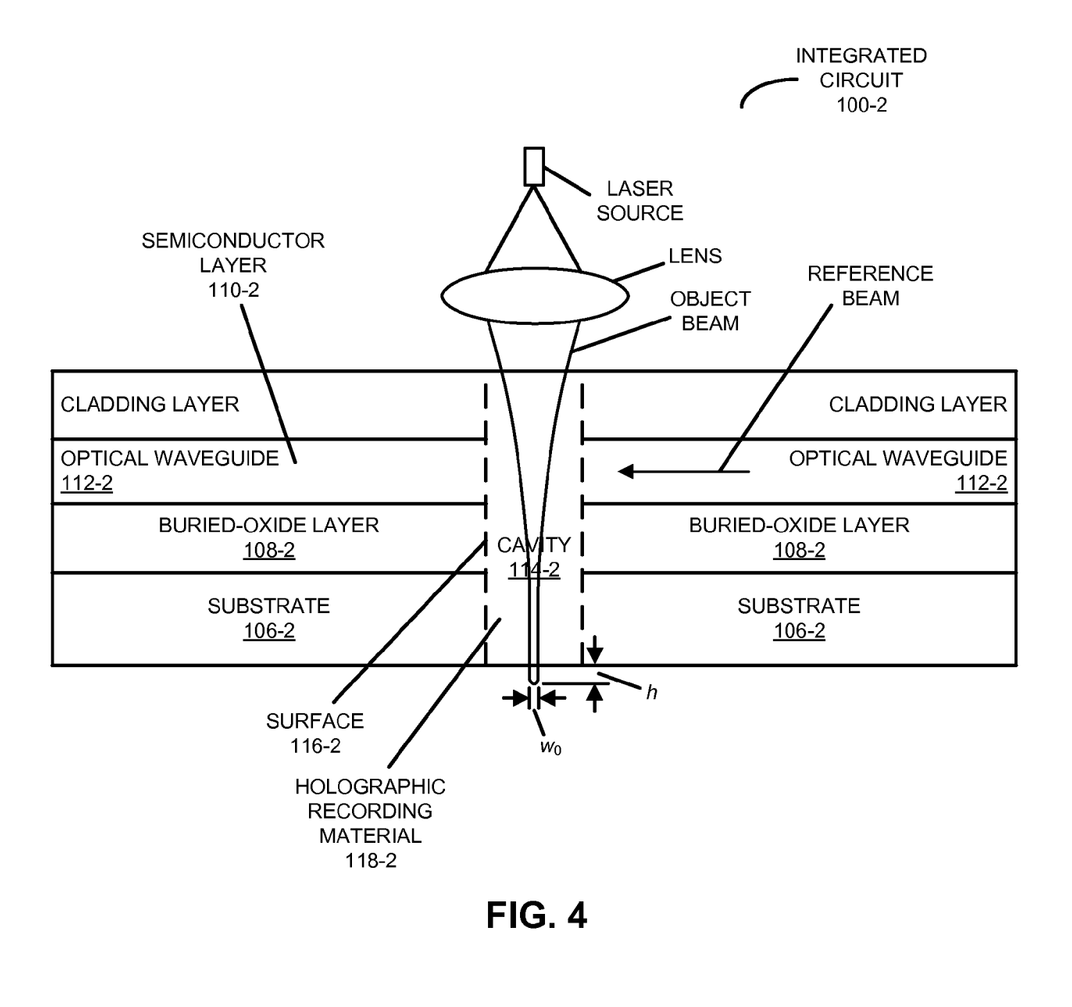
FIG. 4 is a block diagram illustrating a side view of an integrated circuit during the recording of a holographic pattern in a holographic recording material in accordance with an embodiment of the present disclosure.
Figure 5:
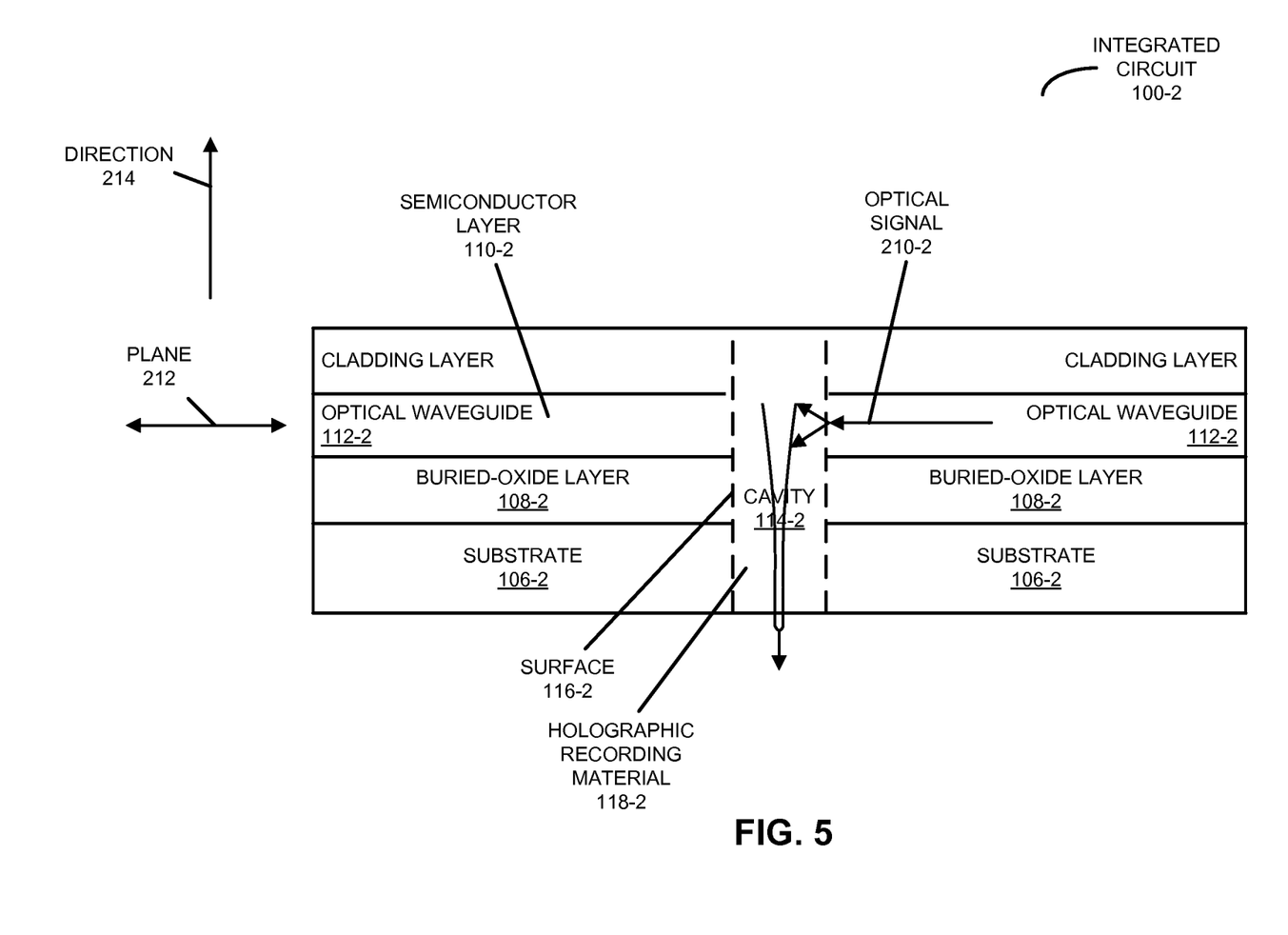
FIG. 5 is a block diagram illustrating a side view of the integrated circuit of FIG. 4 during reconstruction of the holographic pattern in the holographic recording material in accordance with an embodiment of the present disclosure.

An illustration of the 'downward' geometry is shown in FIGS. 4 and 5. In particular, FIG. 4 presents a block diagram illustrating a side view of an integrated circuit 100-2 during the recording of a holographic pattern in holographic recording material 118-1.

The resulting hologram diffracts optical signal 210-2 toward the bottom of integrated circuit 100-2 when a read-out beam reconstructs the object beam. This is shown in FIG. 5, which presents a block diagram illustrating a side view of integrated circuit 100-2 during reconstruction of the holographic pattern in holographic recording material 118-1.

Figure 6:
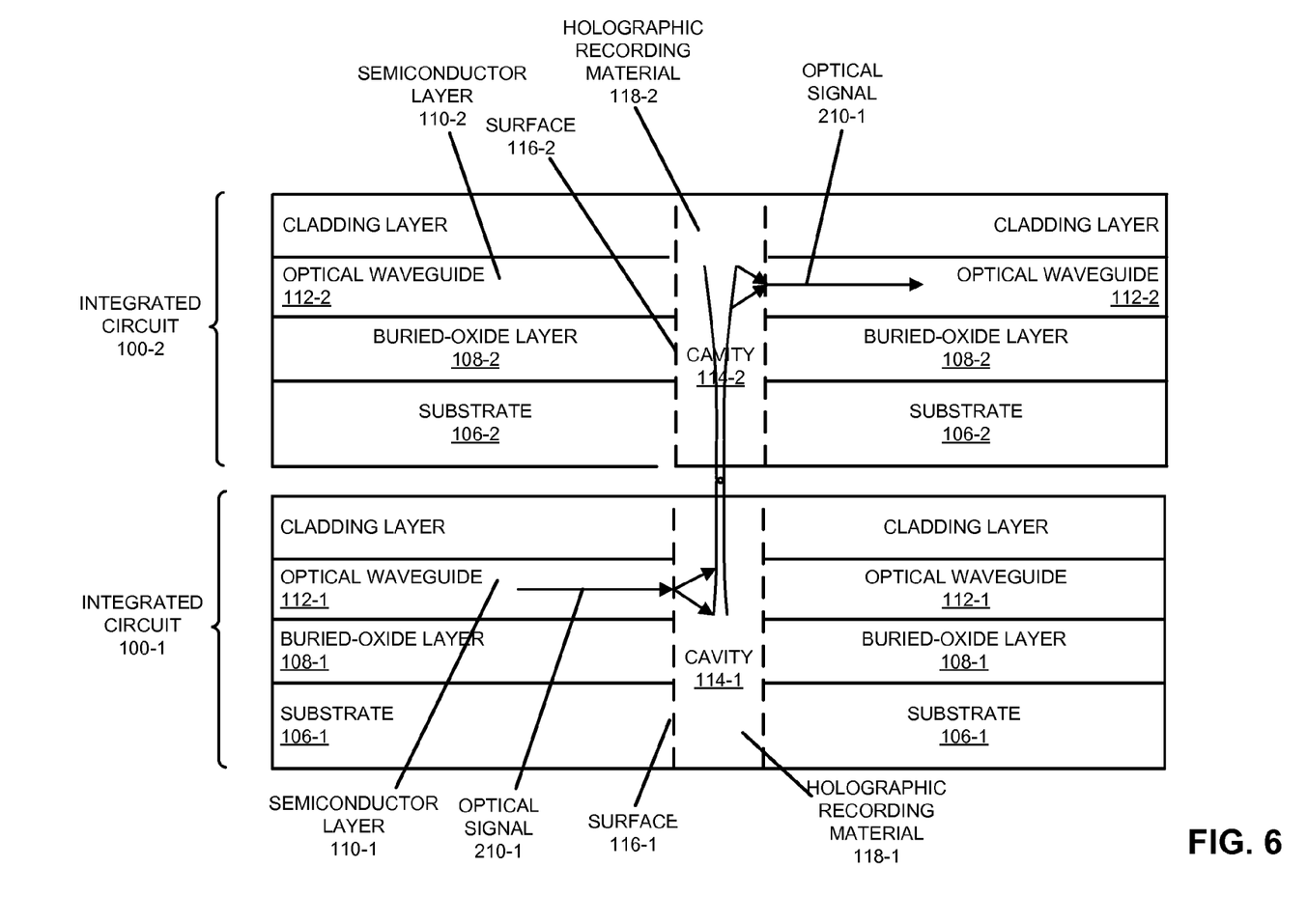
FIG. 6 is a block diagram illustrating a side view of the integrated circuits of FIGS. 1 and 4 during surface-normal coupling of an optical signal to another integrated circuit using the holographic pattern in the holographic recording material in accordance with an embodiment of the present disclosure.

Referring back to FIG. 1, using this approach an optical via may be created that diffracts optical signal 210-1 from optical waveguide 112-1 to another optical waveguide in integrated circuit 100-1 or in another integrated circuit (i.e., intra- or inter-chip coupling), which may be useful for 3D stacking of chips. This is shown in FIG. 6, which presents a block diagram illustrating a side view of integrated circuit 100-1 during surface-normal coupling of optical signal 210-1 to integrated circuit 100-2 using the holographic patterns in holographic recording materials 118. In this example, the holograms in holographic recording materials 118 may be recorded using identical object beams.

Thus, holographic recording material 118-1 may diffract optical signal 210-1 to holographic recording material 118-2, which diffracts optical signal 210-1 into an optical waveguide 112-2 (i.e., into plane 212 of optical waveguide 112-2). (Said differently, the holographic recording material may be used as an optical via for optical waveguide-to-optical waveguide optical proximity coupling or OPxC.) While silicon substrates 106 are transparent at wavelengths of 1.3 or 1.55 μm, reflections may occur. As a consequence, at least a portion of substrates 106 may be selectively removed.

Because the holographic recording material can be fabricated in situ, losses due to packaging misalignment can be reduced or minimized. For example, in FIG. 3 optical fiber 310 can be coarsely aligned with cavity 114-1 before recording. Because the recording laser source is then aligned with optical fiber 310 when the hologram is recorded, the hologram may automatically align optical waveguide 112-1 with optical fiber 310. Similarly for the optical waveguide-to-optical waveguide coupling shown in FIG. 6, integrated circuits 100 can be integrated together with coarse alignment before the holograms are recorded. Two recording laser sources that have identical focusing beam parameters, and which are aligned and facing each other, can then be used to record the holograms in holographic recording materials 118. After recording, optical signal 210-1 from optical waveguide 112-1 may be coupled to optical waveguide 112-2 through holographic recording materials 118 without suffering misalignment (and optical losses) from integration and packaging.

The surface-normal coupler may be used in an implementation of wavelength division multiplexing (WDM). In particular, the surface-normal coupler may be broadband. For example, it may have high and uniform efficiency over a large wavelength range (such as in the C-band, between 1.520-1.560 µm). This may be accomplished by recording a hologram with all the wavelengths in the desired range. Holographic recording of multiple wavelengths can be achieved in a volume holographic recording medium.

However, note that holographic recording of diffraction gratings only happen pairwise with matched wavelengths that satisfy coherence requirements. For example, a diffraction grating may only be formed when an object beam at wavelength $\lambda_1$ interferes with a reference beam at wavelength $\lambda_1$. Diffraction gratings are not formed between $\lambda_1$ and $\lambda_N$ (where N is other than 1). Therefore, if there are N discrete wavelengths required over the desired range of wavelengths, N discrete volume diffraction gratings may be recorded.

Note that the holographic volume diffraction grating may be highly wavelength selective. As a consequence, during reconstruction of a hologram, when a signal beam at wavelength $\lambda_1$ is injected into optical waveguide 112-1, only the wavelength $\lambda_1$ may be diffracted 90° (corner bend) and the correct mode field for coupling may be established at that wavelength.

In general, multiple-wavelength recording of the volume hologram can be accomplished in a variety of ways. For example, a broadband laser source may be split in two. One path may go into the signal path of optical waveguide 112-1 and the second path may provide a reference beam that goes through a lens arrangement in the optics. Then, as noted previously, a volume holographic record of all the matching pairs of wavelengths may be created.

Alternatively, a discrete set of laser wavelengths may be multiplexed (for example, using a multiplexing element, such as an echelle grating) and split into two paths. One path may go into the signal path of optical waveguide 112-1 and the second path may provide a reference beam that goes through a lens arrangement in the optics. Then, once again, a volume holographic record of all the matching pairs of wavelengths may be created.

Figure 7:
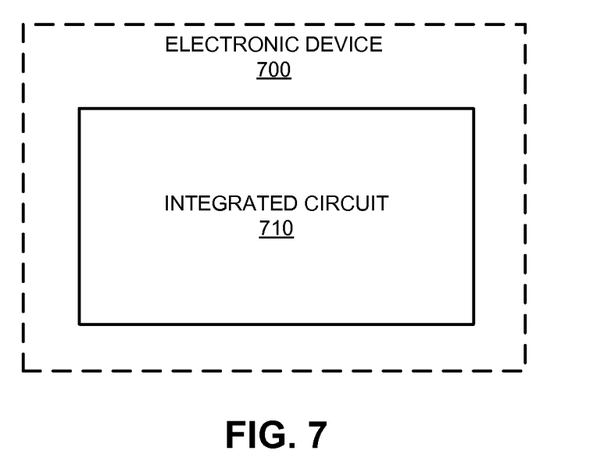
FIG. 7 is a block diagram illustrating an electronic device that includes an integrated circuit in accordance with an embodiment of the present disclosure.

We now describe embodiments of an electronic device and the system. FIG. 7 presents a block diagram illustrating an electronic device 700 that includes an integrated circuit 710, such as integrated circuit 100-1 (FIGS. 1-3 and 6) or 100-2 (FIGS. 4-6).

Figure 8:
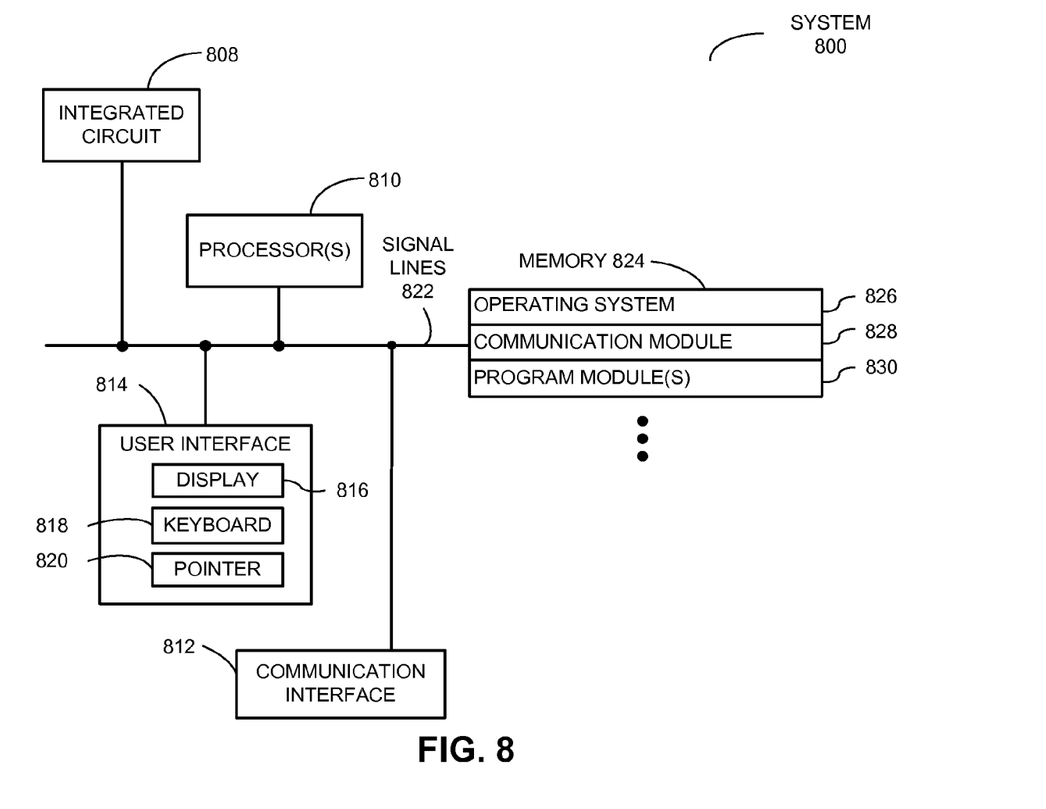
FIG. 8 is a block diagram illustrating a system that includes an integrated circuit in accordance with an embodiment of the present disclosure.

FIG. 8 presents a block diagram of a system 800 that includes an integrated circuit 808, such as integrated circuit 100-1 (FIGS. 1-3 and 6) or 100-2 (FIGS. 4-6). System 800 may include: one or more processors 810, a communication interface 812 and a user interface 814, which may be coupled to other components in system 800 by one or more signal lines 822. Note that the one or more processors (or processor cores) 810 may support parallel processing and/or multi-threaded operation, the communication interface 812 may have a persistent communication connection, and the one or more signal lines 822 may constitute a communication bus. Moreover, the user interface 814 may include: a display 816, a keyboard 818, and/or a pointer 820, such as a mouse.

Memory 824 in system 800 may include volatile memory and/or non-volatile memory. More specifically, memory 824 may include: ROM, RAM, EPROM, EEPROM, flash, one or more smart cards, one or more magnetic disc storage devices, and/or one or more optical storage devices. Memory 824 may store an operating system 826 that includes procedures (or a set of instructions) for handling various basic system services for performing hardware-dependent tasks. Moreover, memory 824 may also store communications procedures (or a set of instructions) in a communication module 828. These communication procedures may be used for communicating with one or more computers, devices and/or servers, including computers, devices and/or servers that are remotely located with respect to the system 800.

Memory 824 may also include one or more program modules 830 (or a set of instructions). Note that one or more of program modules 830 may constitute a computer-program mechanism. Instructions in the various modules in the memory 824 may be implemented in: a high-level procedural language, an object-oriented programming language, and/or in an assembly or machine language. The programming language may be compiled or interpreted, i.e., configurable or configured, to be executed by the one or more processors (or processor cores) 810.

System 800 may include, but is not limited to: a server, a laptop computer, a communication device or system, a personal computer, a work station, a mainframe computer, a blade, an enterprise computer, a data center, a portable-computing device, a tablet computer, a cellular telephone, a supercomputer, a network-attached-storage (NAS) system, a storage-area-network (SAN) system, an electronic device, and/or another electronic computing device.

Note that embodiments of integrated circuit 808 may be used in a variety of applications, including: VLSI circuits, communication systems (such as in wavelength division multiplexing), storage area networks, data centers, networks (such as local area networks), and/or computer systems (such as multiple-core processor computer systems). For example, the integrated circuit may be included in a backplane that is coupled to multiple processor blades, or the integrated circuit may couple different types of components (such as processors, memory, input/output devices, and/or peripheral devices). Thus, the integrated circuit may perform the functions of: a switch, a hub, a bridge, and/or a router.

In general, system 800 may be at one location or may be distributed over multiple, geographically dispersed locations. Moreover, some or all of the functionality of system 800 may be implemented in one or more application-specific integrated circuits (ASICs) and/or one or more digital signal processors (DSPs). Furthermore, functionality in the preceding embodiments may be implemented more in hardware and less in software, or less in hardware and more in software, as is known in the art.

The preceding embodiments may include fewer components or additional components. Moreover, although the integrated circuit and system are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. Furthermore, features in two or more of the preceding embodiments may be combined with one another.

In some embodiments, integrated circuit 808 is used with SOI platforms (including SOI platforms with a wide range of layer thicknesses) and/or other photonic integrated circuits (PICs), such as those fabricated on glass substrates.

Note that integrated circuit 808 may be fabricated using an additive process (i.e., a material-deposition process) and/or a subtractive process (i.e., a material-removal process). For example, the process may include: sputtering, plating, isotropic etching, anisotropic etching, a photolithographic technique and/or a direct-write technique. In an exemplary embodiment, cavity 114-1 (FIG. 1) is defined using a subtractive process and holographic recording material 118-1 (FIG. 1) is deposited using an additive process. Additionally, these processes may utilize a wide variety of materials, including: a semiconductor, metal, glass, sapphire, an organic material, a ceramic material, a plastic and/or silicon dioxide. Thus, while the preceding embodiments illustrated integrated circuit with silicon in the semiconductor layer and the substrate, a wide variety of material can be used. For example, the substrate may include glass or plastic.

Figure 9:
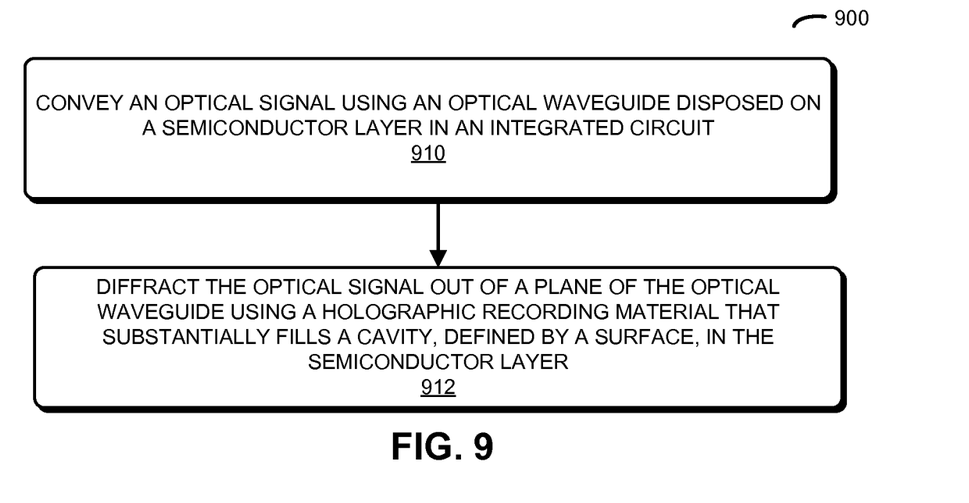
FIG. 9 is a flow chart illustrating a method for diffracting an optical signal in an integrated circuit in accordance with an embodiment of the present disclosure.

We now describe embodiments of the method. FIG. 9 presents a flow chart illustrating a method 900 for diffracting an optical signal in an integrated circuit, such as integrated circuit 100-1 (FIGS. 1-3 and 6) or 100-2 (FIGS. 4-6). During operation, an optical waveguide, disposed in a semiconductor layer in the integrated circuit, conveys an optical signal in a plane of the optical waveguide (operation 910). Then, a holographic recording material that substantially fills a cavity, defined by a surface, in the semiconductor layer diffracts the optical signal out of a plane of the optical waveguide (operation 912).

In some embodiments of method 900, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
   an optical waveguide defined in a semiconductor layer, wherein the optical waveguide is interposed between a cladding layer and a buried-oxide layer;
   a cavity, defined by a surface, in the semiconductor layer;
   a holographic recording material substantially filling the cavity, wherein the holographic recording material is configured to diffract an optical signal propagating in a plane of the optical waveguide out of the plane through the cavity;
   an optical fiber having a symmetry axis along a direction perpendicular to the plane of the waveguide, wherein the holographic recording material is configured to diffract the optical signal from the optical waveguide to the optical fiber, and wherein one end-face of the optical fiber is optically coupled to one edge of the cavity, wherein the optical fiber does not extend through the cavity; and
   a substrate;
   wherein the buried-oxide layer is disposed on the substrate, wherein the semiconductor layer is disposed on the buried-oxide layer, and wherein the cavity extends through the buried-oxide layer and the substrate.

2. The integrated circuit of claim 1, wherein the semiconductor includes silicon.

3. The integrated circuit of claim 1, wherein the optical signal is diffracted at an angle of 90° with respect to a direction of propagation in the plane.

4. The integrated circuit of claim 1, wherein the substrate includes a semiconductor.

5. The integrated circuit of claim 1, wherein the substrate, the buried-oxide layer and the semiconductor layer comprise a silicon-on-insulator technology.

6. The integrated circuit of claim 1, wherein the holographic recording material includes a volume diffraction grating so that a range of wavelengths in the optical signal are diffracted out of the plane.

7. The integrated circuit of claim 6, wherein the range of wavelengths is at least 40 nm wide.

8. A system, comprising:
   a processor;
   a memory configured to store a program module, wherein the program module is configurable to be executed by the processor; and
   an integrated circuit, wherein the integrated circuit includes:
   an optical waveguide defined in a semiconductor layer, wherein the optical waveguide is interposed between a cladding layer and a buried-oxide layer;
   a cavity, defined by a surface, in the semiconductor layer;
   a holographic recording material substantially filling the cavity, wherein the holographic recording material is configured to diffract an optical signal propagating in a plane of the optical waveguide out of the plane through the cavity;
   an optical fiber having a symmetry axis along a direction perpendicular to the plane of the waveguide, wherein the holographic recording material is configured to diffract the optical signal from the optical waveguide to the optical fiber, and wherein one end-face of the optical fiber is optically coupled to one edge of the cavity, wherein the optical fiber does not extend through the cavity; and
   a substrate;
   wherein the buried-oxide layer is disposed on the substrate, wherein the semiconductor layer is disposed on the buried-oxide layer, and wherein the cavity extends through the buried-oxide layer and the substrate.

9. The system of claim 8, wherein the semiconductor includes silicon.

10. The system of claim 8, wherein the optical signal is diffracted at an angle of 90° with respect to a direction of propagation in the plane.

11. The system of claim 8, wherein the substrate, the buried-oxide layer and the semiconductor layer comprise a silicon-on-insulator technology.

12. The system of claim 8, wherein the holographic recording material includes a volume diffraction grating so that a range of wavelengths in the optical signal are diffracted out of the plane.

13. The system of claim 8, further comprising a second instance of the integrated circuit, wherein a second cavity in the second instance is aligned with the cavity so that the diffracted optical signal is conveyed from the integrated circuit to the second integrated circuit.

14. A method for diffracting an optical signal in an integrated circuit, comprising:
   conveying the optical signal in a plane of an optical waveguide disposed in a semiconductor layer in the integrated circuit, wherein the optical waveguide is interposed between a cladding layer and a buried-oxide layer, wherein the buried-oxide layer is disposed on a substrate, wherein the semiconductor layer is disposed on the buried-oxide layer;

diffracting the optical signal out of the plane of the optical waveguide using a holographic recording material that substantially fills a cavity, defined by a surface, in the semiconductor layer, wherein the cavity extends through the buried-oxide layer and the substrate; and optically coupling one end-face of an optical fiber to one edge of the cavity, wherein the optical fiber has a symmetry axis along a direction perpendicular to the plane of the optical waveguide, wherein the optical fiber does not extend through the cavity.

15. The integrated circuit of claim 1, wherein the optical waveguide has a thickness between 0.25 and 3 μm.

16. The method of claim 14, wherein the semiconductor includes silicon.

17. The method of claim 14, wherein the optical signal is diffracted at an angle of 90° with respect to a direction of propagation in the plane.

18. The method of claim 14, wherein the substrate includes a semiconductor.

19. The method of claim 14, wherein the substrate, the buried-oxide layer and the semiconductor layer comprise a silicon-on-insulator technology.

20. The method of claim 14, wherein the holographic recording material includes a volume diffraction grating so that a range of wavelengths in the optical signal are diffracted out of the plane.

* * * * *

UNITED STATES PATENT AND TRADEMARK OFFICE
CERTIFICATE OF CORRECTION

| | |
|---|---|
| PATENT NO. | : 9,091,806 B2 |
| APPLICATION NO. | : 13/440839 |
| DATED | : July 28, 2015 |
| INVENTOR(S) | : Zheng et al. |

Page 1 of 1

It is certified that error appears in the above-identified patent and that said Letters Patent is hereby corrected as shown below:

In the specification,

In column 5, line 2, delete "up to) 90°)." and insert -- up to 90°). --, therefor.

Signed and Sealed this
Seventeenth Day of May, 2016

Michelle K. Lee
*Director of the United States Patent and Trademark Office*